(12) United States Patent
Manders et al.

(10) Patent No.: US 11,573,341 B2
(45) Date of Patent: Feb. 7, 2023

(54) OVERLAPPED SCHEDULING AND SORTING FOR ACOUSTIC TRANSDUCER PULSES

(71) Applicant: DARKVISION TECHNOLOGIES INC, North Vancouver (CA)

(72) Inventors: Graham Manders, Vancouver (CA); Michael Halpenny-Mason, Vancouver (CA)

(73) Assignee: DARKVISION TECHNOLOGIES INC, North Vancouver (CA)

( * ) Notice: Subject to any disclaimer, the term of this patent is extended or adjusted under 35 U.S.C. 154(b) by 497 days.

(21) Appl. No.: 16/653,374

(22) Filed: Oct. 15, 2019

(65) Prior Publication Data
US 2020/0116880 A1 Apr. 16, 2020

(30) Foreign Application Priority Data

Oct. 16, 2018 (GB) ..................... 1816867

(51) Int. Cl.
*G01V 1/24* (2006.01)
*G01S 7/527* (2006.01)
(Continued)

(52) U.S. Cl.
CPC .............. *G01V 1/247* (2013.01); *G01S 7/527* (2013.01); *G01S 15/89* (2013.01); *G01V 1/162* (2013.01); *G01V 1/20* (2013.01); *G01V 1/46* (2013.01)

(58) Field of Classification Search
None
See application file for complete search history.

(56) References Cited

U.S. PATENT DOCUMENTS

| 4,947,683 A | * | 8/1990 | Minear | ................. E21B 47/107 73/152.32 |
| 2009/0221917 A1 | * | 9/2009 | Southern | .............. A61B 5/0048 600/444 |

(Continued)

FOREIGN PATENT DOCUMENTS

| CA | 2989439 A1 | 12/2016 | |
| GB | 2387226 A | * 10/2003 | ............. G01V 1/005 |

OTHER PUBLICATIONS

Jang, Interleaved Radar Pulse Scheduling for Multitarget Tracking With Multiple Simultaneous Receive Beams, IEEE, 1301-1318 (Year: 2018).*

(Continued)

*Primary Examiner* — Isam A Alsomiri
*Assistant Examiner* — Vikas Atmakuri

(57) ABSTRACT

A device and method used to increase the resolution when imaging, measuring and inspecting wells, pipes and objects located therein. The device comprises an array of acoustic transducers that both transmit and receive acoustic signals. Scan lines may be overlapped by interlacing transmission and receiving windows thus increasing either the resolution or logging speed drastically compared to conventional approaches. The sequence of the scan lines making up an imaging frame is created by stratifying physically close lines and randomly selecting from within each stratum, preventing interference from neighboring transducers, signals and acoustic artifacts that fundamentally limit logging speed and resolution using conventional methods.

19 Claims, 13 Drawing Sheets

(51) Int. Cl.
    *G01S 15/89*     (2006.01)
    *G01V 1/16*     (2006.01)
    *G01V 1/20*     (2006.01)
    *G01V 1/46*     (2006.01)

(56) References Cited

U.S. PATENT DOCUMENTS

| | | | |
|---|---|---|---|
| 2013/0336091 A1* | 12/2013 | Song | G01V 1/288 367/38 |
| 2016/0290847 A1* | 10/2016 | Gronsberg | G01N 29/225 |
| 2017/0096891 A1* | 4/2017 | Gao | E21B 47/24 |
| 2018/0156025 A1* | 6/2018 | Manders | G01N 29/341 |
| 2019/0101663 A1* | 4/2019 | Walters | G01V 1/52 |
| 2020/0116880 A1* | 4/2020 | Manders | G01V 1/48 |

OTHER PUBLICATIONS

Canadian (CIPO) Search Report for CA 3,057,771, dated Jan. 22, 2020, 6 pages.

Spasojevic, Zoran, et al., "Dwell Scheduling Algorithms for Phased Array Antenna", IEEE Transactions on Aerospace and Electronic Systems, vol. 49(1):42-54, Jan. 2013.

\* cited by examiner

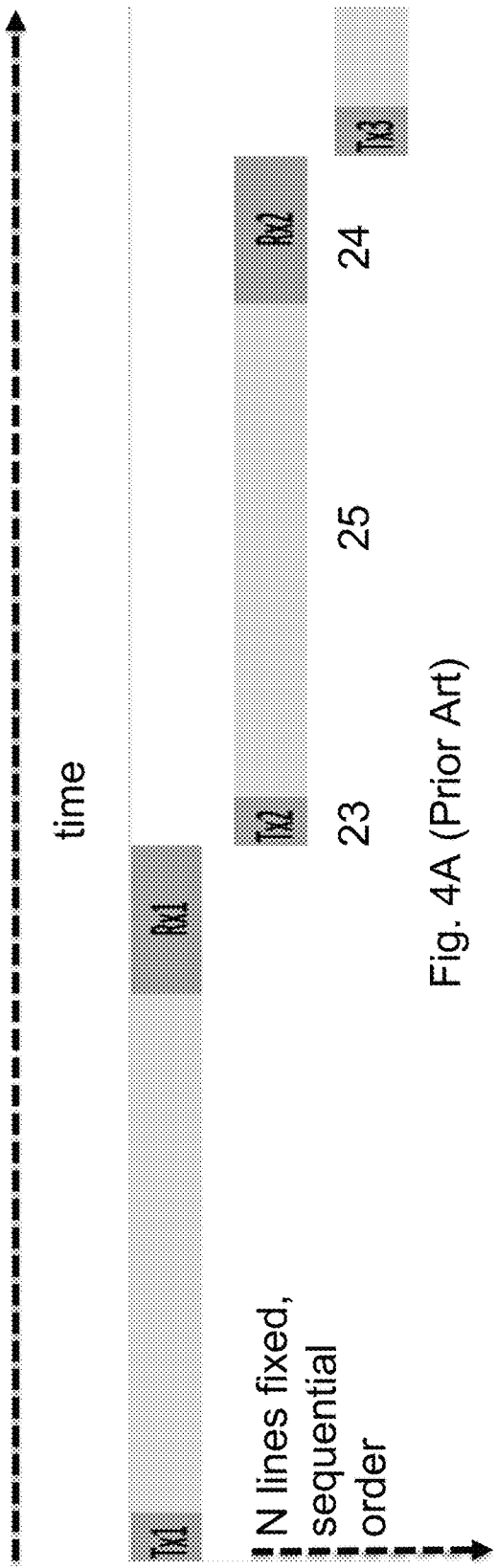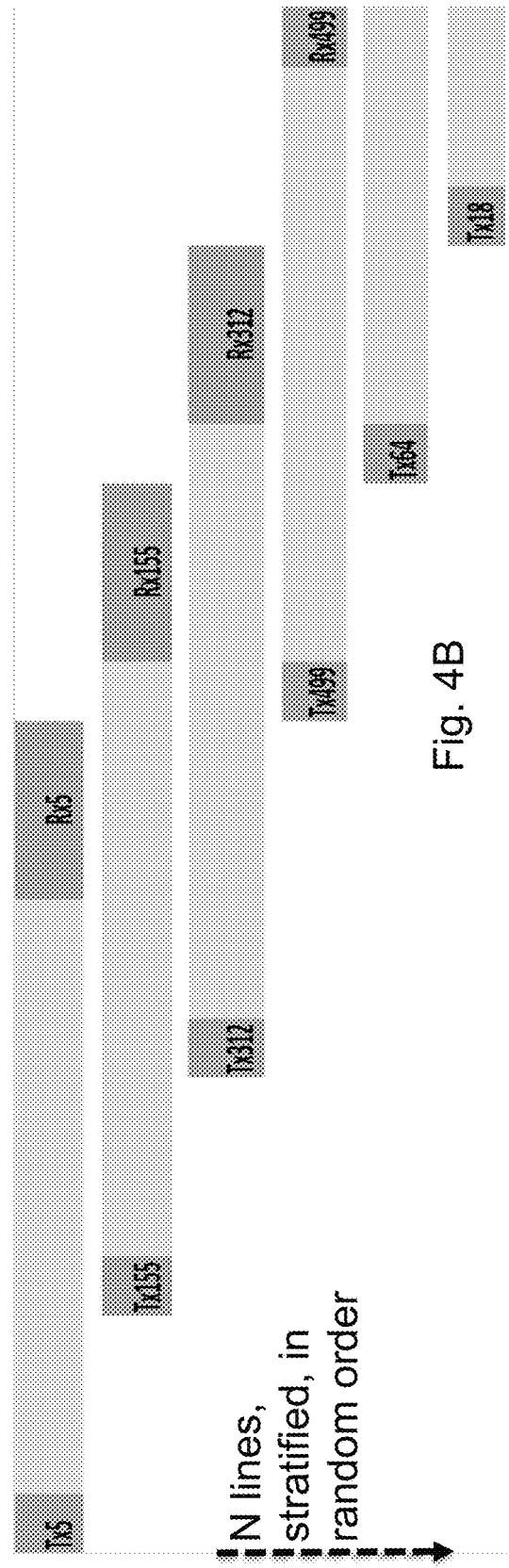
Fig. 4A (Prior Art)
Fig. 4B

| 0 | 1 | 2 | 3 | 4 | 5 | 6 | 7 |
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

```
vector<int> createStucturedLineOrder(const int numLines, const int numStratum)
{
    vector<int> lineOrder(numLines);
    int numCycles = numLines / numStratum;
    for (int cycleNo = 0; cycleNo < numCycles; ++cycleNo) {
        for (int stratumNo = 0; stratumNo < numStratum; ++stratumNo) {
            lineOrder[cycleNo * numStratum + stratumNo] = numLines * (stratumNo + cycleNo / numCycles) / numStratum;
        }
    }
    return lineOrder;
}
```

Fig. 12A

```
vector<int> createSparseRandomLineOrder(const int numLines, const int numStratum)
{
    vector<int> lineOrder(numLines);

int numCycles = numLines / numStratum;

for (int cycleNo = 0; cycleNo < numCycles; ++cycleNo) {
        for (int stratumNo = 0; stratumNo < numStratum; ++stratumNo) {
            lineOrder[cycleNo * numStratum + stratumNo] = numLines * (stratumNo + cycleNo / numCycles) / numStratum;
        }
    }
    for (int cycleNo = 0; cycleNo < numCycles; ++cycleNo) {
        const int randomNo = cycleNo + random() * (numCycles - cycleNo);
        for (int stratumNo = 0; stratumNo < numStratum; ++stratumNo) {
            int temp = lineOrder[cycleNo * numStratum + stratumNo];
            lineOrder[cycleNo * numStratum + stratumNo] = lineOrder[randomNo * numStratum + stratumNo];
            lineOrder[randomNo * numStratum + stratumNo] = temp;
        }
    }
    return lineOrder;
}
```

Fig. 12B

OVERLAPPED SCHEDULING AND SORTING FOR ACOUSTIC TRANSDUCER PULSES

FIELD OF THE INVENTION

The invention relates generally to inspection of fluid-carrying systems, in particular, acoustic sensors in oil & gas wells, water wells, geothermal wells, water mains or pipelines.

BACKGROUND OF THE INVENTION

In wells and fluid carrying pipes, such as oil wells and water delivery infrastructure, there often arises a need to inspect the internal structure for integrity or obstructions. For example, hydrocarbons in production tubes may contaminate ground water if leaks Obstructions may be pipe deformations and items dropped, broken or left behind. Ultrasound is a known way of imaging such structures.

In some configurations, such as that taught in CA2989439 the ultrasound sensors are disposed radially around a collar of the device, each sensor facing generally outward towards the walls of the pipe or well. Each sensing element may be a piezoelectric transducer arranged to project most of its generated sound energy perpendicular to its top plane. This energy travels through the fluid medium and backscatters off the wall (and subsequent layers) to be absorbed by all transducers in the array.

If all the transducers are activated simultaneously and the device is centered in the well, each transducer will receive a first pulse that corresponds to its own generated pulse backscattering off the wall, following by additional pulses from the other transducers with their longer travel time. These additional pulses are confounded with each other and with each transducer's own pulses scattered from deeper layers.

Alternatively, transducers may be operated sequentially, whereby the first transducers transmits and then receives pulses before the second transducer starts transmitting. This avoids confounding of the various pulses. However, this restricts the linear scan rate of the device overall, as the device must wait for all transducers in a frame to transmit and receive before proceeding along the well.

The present invention aims to address one or more of the above shortcomings by operating transducers in a novel way.

SUMMARY OF THE INVENTION

In accordance with the invention, there is provided a method of operating a device having an array of acoustic transducers. The method comprises deploying the device into a well or pipe; capturing frames comprising plural scan lines, each scan line generated by one or more of the acoustic transducers; and for each scan line, transmitting an acoustic wave during a transmission period then receiving a reflected acoustic wave during a receiving period, separated from the transmission by a dwell period, wherein the transmit period of a given scan line is scheduled during the dwell period of a previous scan line.

The method may comprise logging the well or pipe by moving the device through the well or pipe while capturing frames.

The method may comprise stratifying the scan lines into physically proximate strata, creating a scan lines sequence for a frame such that consecutive scan lines are from different strata, and scheduling scan lines according to the sequence.

The scan lines may be added to the sequence by randomly selecting scan lines within each stratum.

The scan lines may be added to the sequence by selecting scan lines within each stratum that maximize the physical distance between consecutive scan lines in the sequence.

The scan lines may be scheduled such that that no transmission period overlaps with another transmission or receiving period.

The method may comprise determining dwell times based on the time-of-flight of the acoustic wave in a well from the array to an inner wall of the well or pipe, preferably wherein determining dwell times is performed for a plurality of the scan lines in the frame, preferably re-determining dwell time while moving the device to log the well or pipe.

The transmission period of at least some scan lines may be scheduled between the receiving period of two previous scan lines.

At least two transmission periods may be scheduled during the dwell period of some of the scan lines.

The method may comprise actively centralizing the array of acoustic transducers in the well or pipe.

The acoustic transducers may face radially away from the device and towards a wall of the well or pipe, preferably facing at least partly in the longitudinal direction of the well or pipe.

The device may comprise a circuit coupled to the array for addressing individual acoustic transducers and the transmitting may comprise providing plural timed electrical pulses to plural transducers generating the scan line.

The array may be a two-dimensional array of transducers coupled to an end of the device, facing at least partly in the longitudinal direction of the well or pipe.

In accordance with the invention, there is provided a device for logging a well or pipe comprising: an array of acoustic transducers and a processing circuit coupled to the acoustic transducers. The circuit is arranged to: capture frames of acoustic data, each frame comprising plural scan lines; generate selection signals to select a set of the acoustic transducers for each scan line; generate timing signals for each of the selected transducers; generate electrical pulses to transmit an acoustic wave by the selected transducers during a transmission period; convert a reflected acoustic wave at the selected transducers to an electrical signal during a receiving period; schedule, for each scan line, the transmit period and the receive period, separated by a dwell period; and schedule the transmit period of a given scan line during the dwell period of a previous scan line.

The processing circuit may comprise a Field Programmable Gate Array (FPGA) for generating the timing signals.

The device may comprise a memory for storing a sequence of the scan lines, preferably wherein consecutive scan lines in the sequence are not physically adjacent.

The sequence may be ordered to maximize the physical distance between consecutive scan lines.

The processing circuit may comprise logic to schedule scan lines such that no transmission period overlaps with another transmission or receiving period.

The processing circuit may comprise logic to calculate dwell times based on the time-of-flight of the acoustic wave in a well from the array to an inner wall of the well or pipe.

The processing circuit may comprise multiplexers for generating the selection signals.

The processing circuit may select scan lines randomly within each stratum to add to the sequence.

The processing circuit may comprise logic to stratify the scan lines into physically proximate strata, create a scan lines sequence for a frame such that consecutive scan lines are from different strata, and schedule scan lines according to the sequence.

The processing circuit may comprise logic to schedule the transmission and receiving periods.

The overlapping of scan lines without creating interfering waves allows the total time for a frame to be drastically reduced. Overlapping several scan lines at the same time can reduce the frame period by up to 80%. Thus the well can be logged at five times the linear speed of prior systems or the resolution can be increased by adding many more scan lines per frame. This allows detection of leaks to the environment to be caught faster.

BRIEF DESCRIPTION OF THE DRAWINGS

Various objects, features and advantages of the invention will be apparent from the following description of embodiments of the invention, as illustrated in the accompanying drawings. The drawings are not necessarily to scale, emphasis instead being placed upon illustrating the principles of various embodiments of the invention.

FIG. 4A is timing diagram for scheduling transducers a prior art operating mode.

FIG. 4B is timing diagram for scheduling transducers in a preferred embodiment.

FIG. 12A is a computer program for ordering scan lines using a structured approach.

FIG. 12B is another computer program for ordering scan lines randomly.

Figure 1:
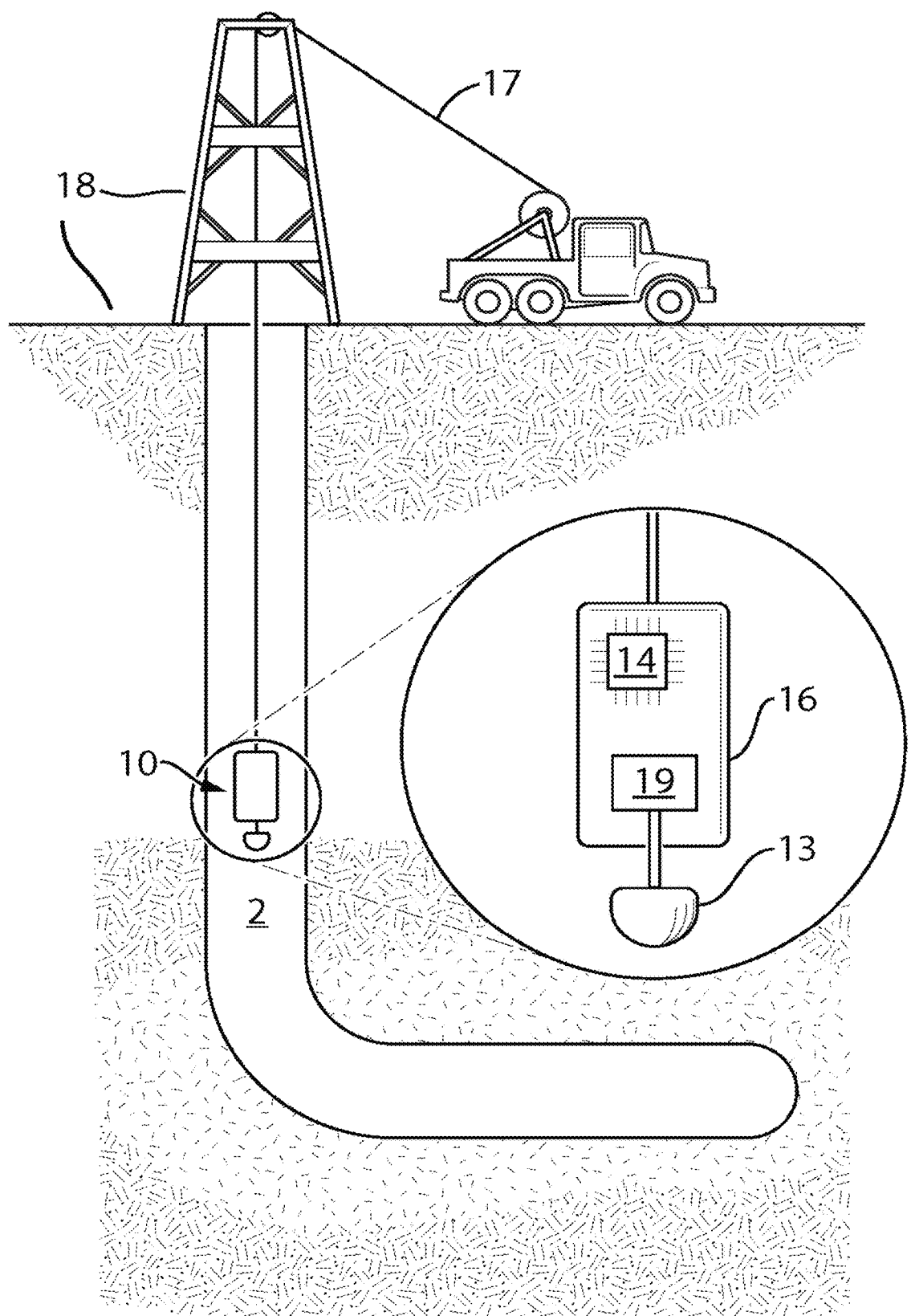
FIG. 1 is a cross-sectional view of an imaging device deployed in a wellbore in accordance with one embodiment of the invention.

Similar reference numerals indicate similar components having the following key:
2 fluid-carrying structure, such as a well, pipe, borehole, tubing, or casing;
10 imaging device;
11 scan line;
12 acoustic array;
13 acoustic transducer;
14 acoustic aperture;
15 imaging/control circuit;
16 housing/body;
17 wireline;
18 operations site;
20 centralizers for urging the device towards the radial center of a well;
22 axial movement for logging;
23 Transmission window, Tx;
24 Receiving window, Rx;
25 dwell;
26 traverse movement;
27 inner radius to capture;
28 outer radius to capture;
29 internal void;
30 inner tube/pipe surface;
31 outer tube/pipe surface;
40 Delta robot;
42 displaceable delta arms (×4);
44 pivoting delta arms (×2);
52 field of view in a volume;
80 Analogue Front End;
81 HV Pulser;
82 HV Mux/Demux;
83 HV Protection switch;
84 FPGA;
85 ADC;
86 Amplifiers (including DVGA, LNA, and Summing Amps);
87 Image processor;
88 Rx beamforming; and
89 Tx beamforming.

DETAILED DESCRIPTION OF THE INVENTION

With reference to the figures, devices and methods are disclosed for improving imaging of a fluid-carrying structure and obstructions therein by an acoustic transducer array. This structure may be a well, pipe for carrying hydrocarbons or water, generally having a long narrow form factor through which the device can move longitudinally. A well includes cased and uncased well, at any stage from during drilled to completion to production to abandonment.

In accordance with one embodiment of the invention, there is provided an imaging device 10 for imaging a wellbore 2, as illustrated in FIG. 1. The imaging device 10 generally comprises an acoustic transducer array 12, a body 16, an imaging circuit 14, a plurality of actuators 19, and one or more centralizing elements 20. Acoustic transducers are desirable in fluid well inspection applications because they can work even in opaque fluids, can be beam steered to change the apparent direction of a wave-front, and can be beam focused to inspect different depths. Thus the imaging device can acquire volumetric data of the well. The volumetric data can include surface features of cases/liners/tubulars, defects in cases/liners/tubulars, and structure of rock formations beyond the tubular.

The device may be that described in patent applications WO2016/201583A1 published 22 Dec. 2016 to Darkvision Technologies Ltd, incorporated herein in its entirety. Described therein is a device having a linear array of radially-facing acoustic transducers.

Transducers

Figure 2A:
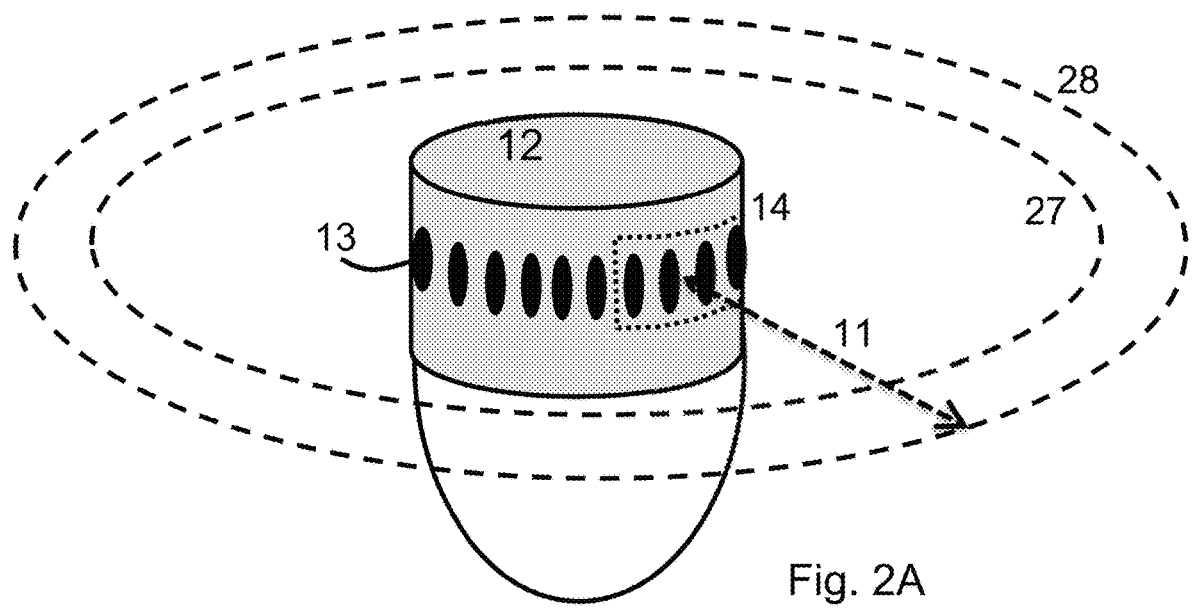
FIG. 2A is a perspective-view of a radially sensor array and a field of view.
Figure 2B:
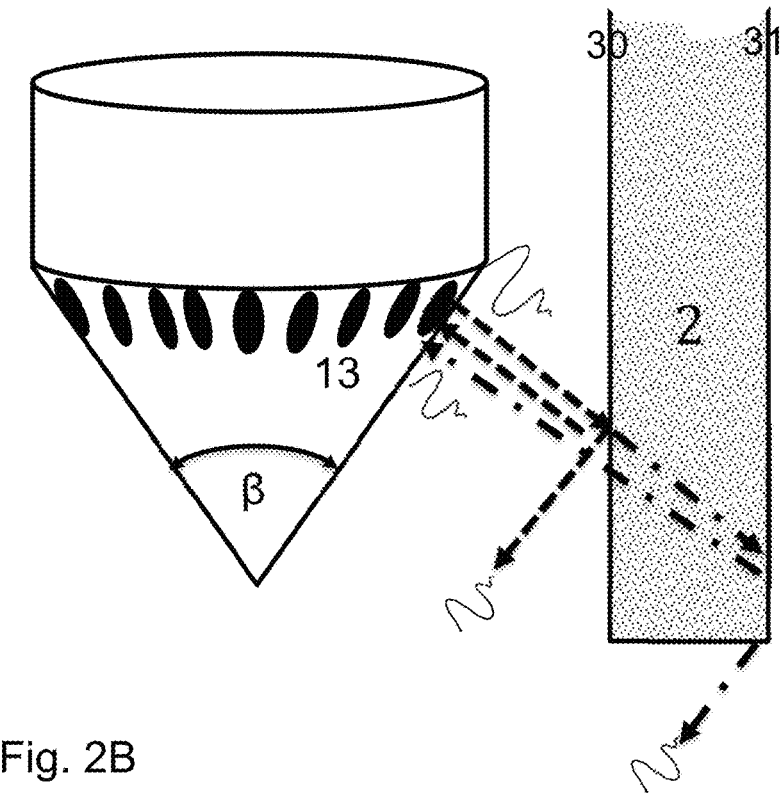
FIG. 2B is a perspective-view of a sensor array in a conical arrangement.
Figure 3:
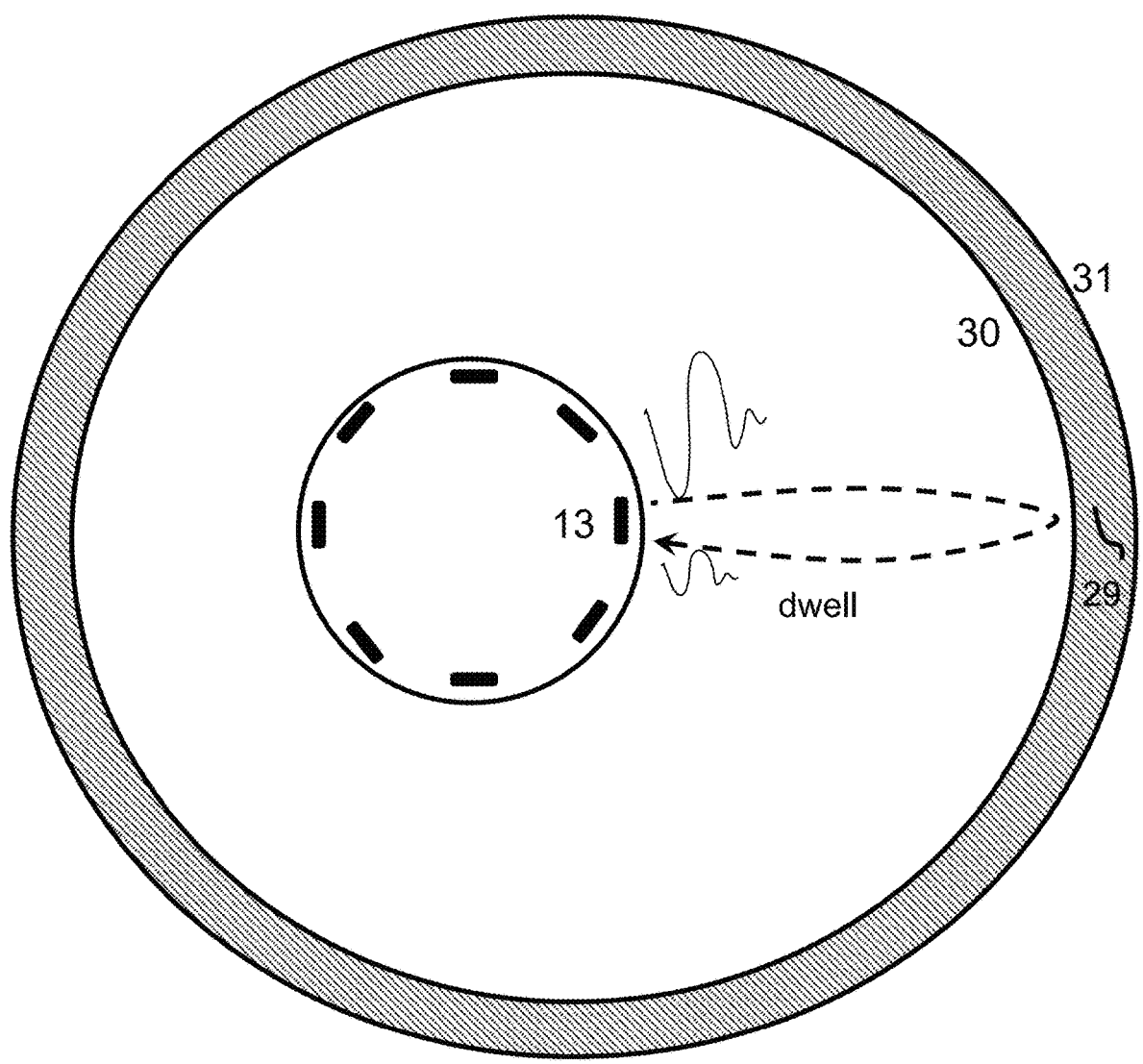
FIG. 3 is top view of a device in a well showing transmission, dwell and reflection.
Figure 8:
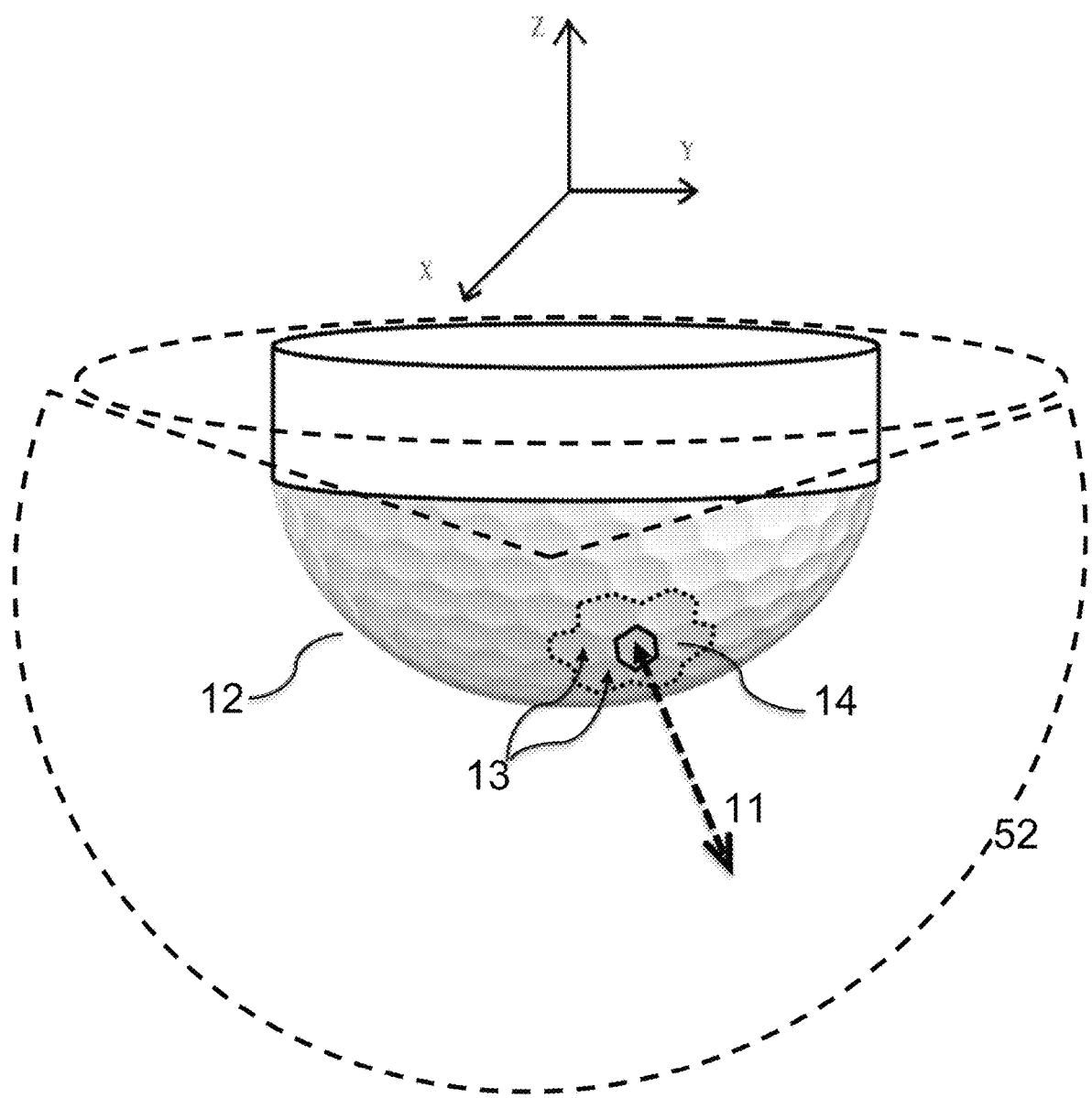
FIG. 8 is a perspective view of a two-dimensional sensor array.
Figure 9:
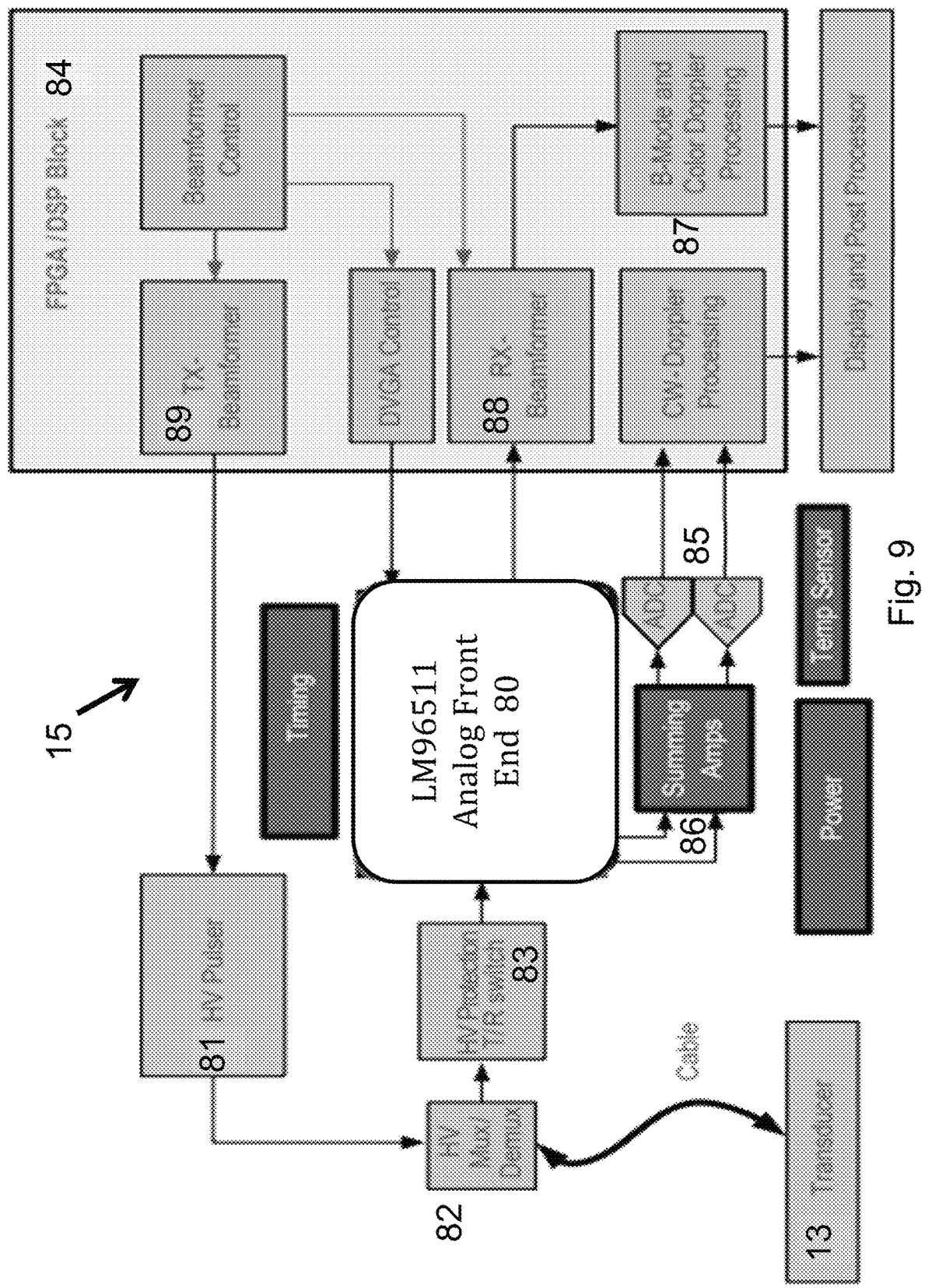
FIG. 9 is a circuit block diagram for ultrasound transducers.

The array comprises a plurality of acoustic transducer elements, preferably operating in the ultrasound band, preferably arranged as a one-dimensional or two-dimensional array (see FIGS. 2A, 2B, 8). The frequency of the ultrasound waves generated by the transducer(s) is generally in the range of 200 kHz to 30 MHz, and may be dependent upon several factors, including the fluid types and velocities in the well or pipe and the speed at which the imaging device is moving. In most uses, the wave frequency is 1 to 10 MHz, which provides reflection from micron features. Conversely, low-frequency waves are useful in seismic surveying of the rock formation at deeper depths.

The number of individual elements in the transducer array affects the resolution of the generated images. Typically, each transducer array is made up of 32 to 2048 elements and preferably 128 to 1024 elements. The use of a relatively large number of elements generates a fine resolution image of the well. The transducers may be piezoelectric, such as the ceramic material, PZT (lead zirconate titanate). Such transducers and their operation are well known and commonly available. Circuits 15 to drive and capture these arrays are also commonly available.

Radially Configured Sensors

The transducers may be distributed equidistant around an annular collar of the device. As seen in FIG. 2A, the transducers 13 may be substantially outward, radially-facing. When the device is situated longitudinally in the well/pipe, this arrangement is useful for measuring wall thickness. In this 'caliper arrangement', a first reflection is received from the inner wall 30 and then a second reflection is received from the outer wall 31. However, there may be multiple reflections as the wave bounces between walls. This transducer arrangement captures a ring-shaped cross-sectional slice of the well covering 360° around the array 12 and is useful for thickness measurements. As the device is moved axially in the well, in either a downhole or uphole direction, the ring-shaped transducer continually captures slices of the well that are perpendicular to the longitudinal axis of the well and logs a 3D image of the well. The ring-shaped transducer may be concentric with the well wall (i.e. the transducer's waves radiate perpendicular to the longitudinal axis of the imaging device which is aligned with the longitudinal axis of the well or pipe).

In the modified arrangement of FIG. 2B, the transducers are distributed on a conical substrate with transducers facing partially in the longitudinal direction of the device, (and thus in the longitudinal direction when in the well). Thus, the radial transducers are angled uphole or downhole to form an oblique-shaped conical field of view. The cone may have a cone angle β of 10-45°, preferably about 20°. In this arrangement, much of the sound wave reflects further downward, but a small portion backscatters off imperfection on the surfaces or voids within the wall back towards the transducer. FIG. 2B shows acoustic pulses (moving in the direction of the dashed lines) transmitted towards inner wall 30, most of which bounces downward and some backwards to the transducer 13. Some of the wave energy (dot-dashed lines) propagates to the outer wall 31, then bounces downward and partially back to the transducer.

This conical design may also face uphole, i.e. towards the proximal end of the device. The array 12 may be located at an end of the device (e.g. FIG. 10) or between the ends (as taught in CA2989439 filed 17 Jun. 2016, incorporated herein in its entirety).

Two-Dimensional Array

Alternatively, transducers 13 may be distributed over a two-dimensional surface, such as a transverse disk, rectangle or the dome shown in FIG. 8. This allows the device to capture a 3D volume of view 52 in a single frame, without the need to move the acoustic array. As discussed, beam steering allows acoustic sensors to image a greater field of view than the physical shape would otherwise indicate.

Scan Frame

An acoustic transducer element can both transmit and receive sound waves. A wave can be synthesized at a location on the sensor array 12, referred to as a 'scan line,' by a single transducer element or a set of transducers, called the aperture 14. The number of scan lines N that make up a full frame may be the same as the number of elements M in the array, but they are not necessarily the same.

Multiple discreet pulses in the aperture interfere constructively and destructively. As known in the art, altering the timing of the pulse at each transducer, can steer and focus the wavefront of a scan line in selectable directions. In steering, the combined wavefront appears to move away in a direction that is not-orthogonal from the transducer face, but still in the plane of the array. In focusing, the waves all converge at a chosen distance from a location within the aperture.

In FIG. 2A, scan line 11 appears to radiate out from the center of the four transducers 13 in aperture 14 (enveloped by the dotted line). In the 2D array of FIG. 8, a 2D aperture of seven neighboring transducers 13 form an aperture (dotted line) that emits a scan line 11 at the central location.

With respect to each scan line, there is a transmission window Tx, receiving window Rx and dwell period therebetween. FIG. 4A is a timing diagram showing sequentially, non-interleaved Tx and Rx periods for scan lines 1 and 2. During transmission, the transducer is excited with an electrical pulser 81, which pulse may be square, sinusoidal or other regular waveform. At the end of Tx there is a dwell period while the wave travel outs and back to the transducer element or aperture. During the Rx window, the circuit 'listens' to reflections at the transducer element or aperture. There may be multiple reflections along paths of various lengths, so the Rx window is much wider than the Tx window.

By way of example, the transmission step may include selecting the elements in the aperture, calculating beam-forming timings, loading the pulse timings from the FPGA 84, activating the pulser 81 and MUXes 82, and the total time to pulse all elements, whereby the Tx may be 13 μs long. The dwell time corresponding to the time of flight thru the pipe (e.g. 10 cm of fluid) and return at a speed of sound (in water) of 1500 m/s would be 133 μs. The dwell period may be set by the operator based on the expected diameter of the pipe and speed of sound in the well fluid. The Rx window may be set to capture the first reflected pulse from the inner radius of interest (27) until the last element has received the last pulse that could reflect off the outer radius of interest 28 (See FIGS. 2A and 2B). The radii to capture 27/28 will normally be wider than the actual wall thickness 30/31. For example, the Rx may be 30 us. Each Tx and Rx operation may include time to electronically switch transducers and load offset timings. Each line scan is thus (13+133+30) 176 μs long.

The dwell and Rx window may be automatically adjusted by the processor to account for the true well diameter, eccentricity, local speed of sound, and last reflected, usable pulse. In the known scheduling shown in FIG. 4A, the array sequentially cycles through all N lines in a frame, whereby 512 lines would take 90 ms. As can be seen here, each Tx window starts just after the previous Rx window ends.

Improved Scheduling

An improvement is to schedule the Tx for each line to complete before the Rx window of the previous line starts. This reduces each sensor period by Rx+Tx, reducing the total frame period by 22 ms in the example above.

However, in preferred embodiments of the present invention, the frame period can be vastly reduced by transmitting multiple pulses (Tx1, Tx2, Tx3, etc.) before the first Rx window, i.e. within the first dwell period. As shown in FIG. 4B, three transmissions are sent before the first receive window is started for listening. This pattern is repeated, with two transmission sent in the dwell period of each previous line scan. Note that there are still no Tx or Rx windows overlapping. In FIG. 4B, there is enough time in the first dwell period to schedule additional Tx but then some windows will overlap and/or the pattern will become unsustainable.

More preferably and generally, a scheduler algorithm or circuit spaces every neighboring pair of Rx windows apart, wide enough to schedule a Tx window. Since the Rx timing depends on the Tx timing, fixed Tx period, and potentially varying dwell period, the scheduling starts displacing the Tx enough to ensure that (whenever possible) there is a gap between successive Rx windows large enough to schedule a Tx window. However, if the transducer array is not centered, the dwell periods will differ and it may not be possible to guarantee this interleaving.

Based on the known or expected well diameter, centering of the sensor array, and speed of sound in the fluid, the processor can calculate how long it should take for each pulse to return (i.e. dwell_n). The Tx and Rx windows are calculated based on beam forming timings and desired physical width to observe, respectively. The scheduler can then calculate how many transmit pulses may be scheduled before the circuit must listen to the first of the pulses to return. In the case of a well-centered device, the receive pulses should come back in the order they were sent. However, when the device is off-center, it is possible to expect that a first transmitted pulse (far from the wall) to return after a second transmitted pulse from a transducer much closer to the wall.

To avoid confounding of received pulses from two lines, the processor does not schedule physically neighboring lines to be activated closely in time. In one embodiment, the processor selects and schedules lines that are physically far apart, systematically proceeding through all lines to complete one frame. A scheduling rule may be that in a sequence for a single frame, each selected line is not a neighbor of the immediate previous line or, more generally, each selected line is at least a set number of lines, acoustic elements, radians or distance apart from the previous line.

Figure 5:
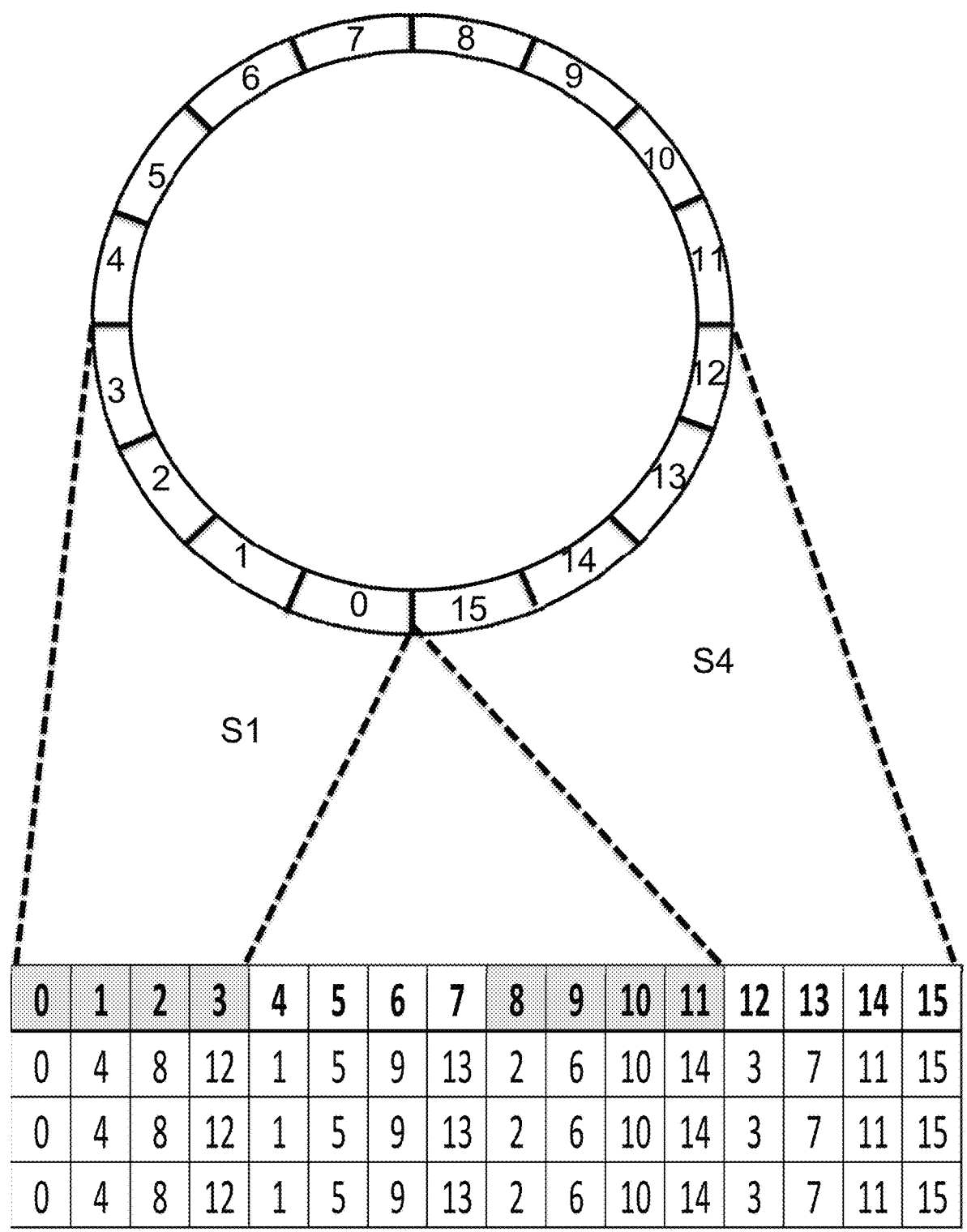
FIG. 5 is an illustration of a radial scan lines and their structurally stratified scheduling.

FIG. 5 is a plan view of a simplified 16-element array, where the numbers in the array indicate the physical location of lines. In the adjoining table, the lines are stratified into 4 physical quadrants (top row), and each line is scheduled (table rows 2-4) 4 lines/88° apart from the previous line (Line0 at 0°, followed by Line4 at 88°, Line8 at 176°, . . . Line15 at 338°). This stratification can be done before the scan operation and remains fixed.

The sequencer may apply a first structured rule to select a preset relative position within each stratum (e.g. first set of lines 0, 4, 8, 12), then increment during each subsequent pass through the stratum (e.g. second set of lines 1, 5, 9, 13) until all lines have been selected for a first frame. This structured approach ensures the sequence of lines is as far apart as possible, on average. Thus the scheduling, after interleaving, may thus be Tx0, Tx4, Tx8, Rx0, Tx12, Rx4, Tx1, Rx8, etc. That is, multiple Tx windows (here three Tx) can be scheduled before the first Rx window.

However, for the next frame, Line0 and Line15 are immediate chronological and spatial neighbors (because the array wraps around). Additionally, in large diameter wells, it is possible that the time-of-flight of one line is so great that it interferes with lines scheduled several periods later in the sequence, such as lines 0 and 4. Moreover these potentially conflicting timings are consistent, meaning that the interference is consistent enough to appear to be a real feature when processed. That is, for every frame, as the sensor array is moved longitudinally in the pipe, there will consistently be a strong signal at Line 0, appearing as a vertical crack, which signal actually comprises some of the energy from Line15.

To avoid this consistent interference, the sequence may be randomized every frame. There may occasionally be some spatially neighboring sensors that are scheduled back to back, but this will appear as white noise over the length of the well scan. As before, the scheduler uses the sequence for a given frame, estimates the dwell time for each line, and interlaces Tx windows as tightly as possible, without any Rx or Tx windows overlapping. In this case, for some portions of the sequence, some lines will be neighbors (or within the set minimum separation limit) and thus not interlaced with each other. FIG. 12A provides example code for generating a structured sequence lineorder( ) of scan lines by selecting a consistent offset within each strata. In this case the offset for each selection cycle is the cycle number.

In order to create an image offline from stored signals of millions of frames, the image processor needs to know the sequence used, which sequence become memory intensive if the sequence were truly random and changing for every frame. Thus, to reduce memory, the random seed may be stored so that the pseudo-random sequence can be reconstructed at a later time.

More preferably, lines are physically stratified and selected randomly from within each strata. In this case, the N lines are pre-stratified into S strata, so that each stratum contained N/S physically neighboring lines (e.g. 512 lines are stratified into 8 strata of 64 neighboring lines). Preferably repeat selections of sensors in the same frame are removed and reselected.

Figure 6:
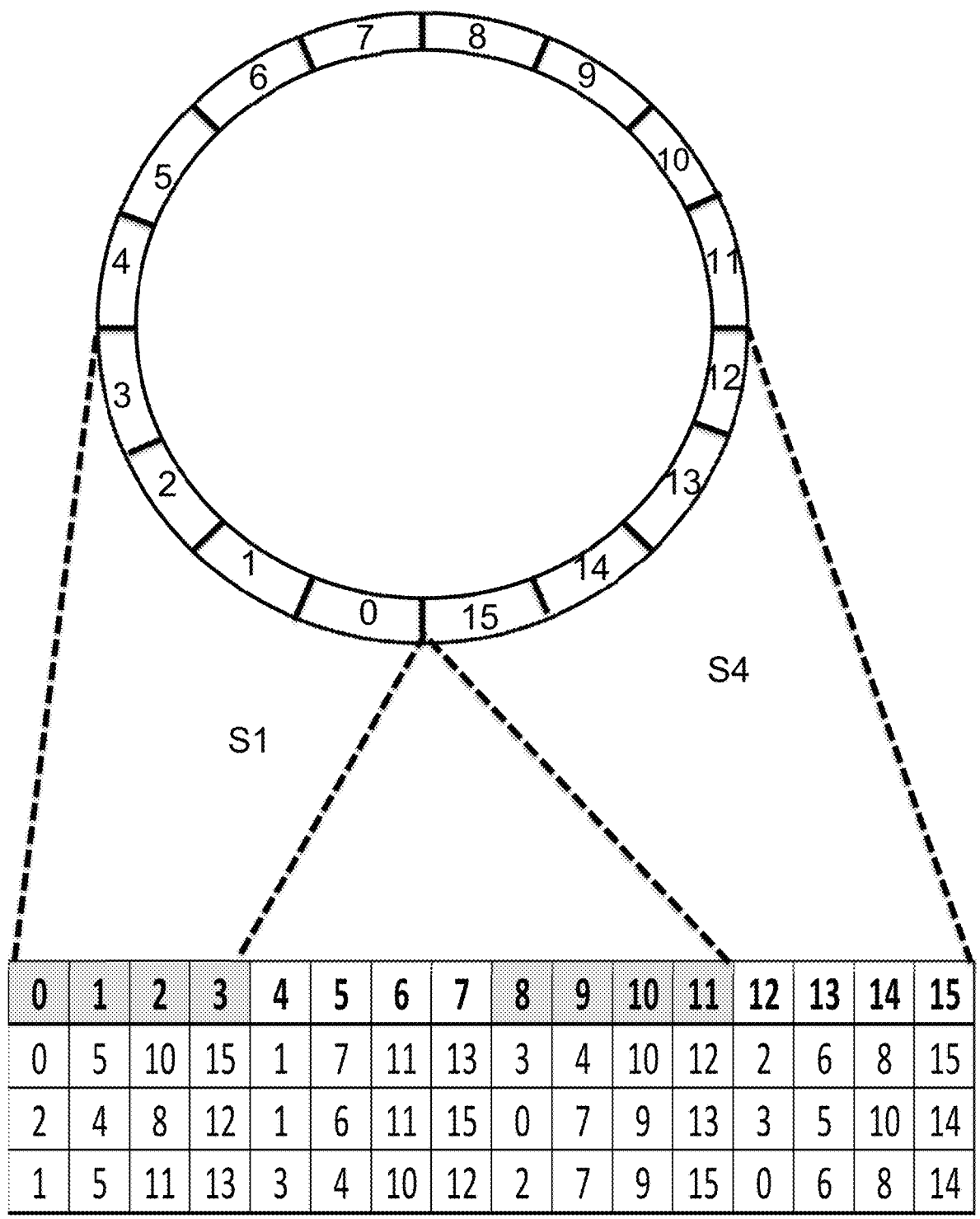
FIG. 6 is an illustration of a radial scan lines and their random stratified scheduling.

In the simplified array of FIG. 6, N=16 total scan lines are stratified into four strata (i.e. S1=scan lines {0, 1, 2, 3}), meaning each stratum contains 4 neighboring scan lines. The sequence is created by selecting one line from each stratum to add to the sequence, possibly sequentially from $S_1$ to $S_S$ then repeated until all lines have been selected for a first frame. Thus consecutive lines in the sequence are always from different strata, on average N/S lines apart. There may be neighbors selected at the strata borders but no clumping of multiple neighbors. The table of FIG. 6 indicates the sequence of lines for three frames in rows 2-4 (the top row indicates the physical order of scan lines).

In a modification of the stratified, random approach, the randomly selected lines are correlated. That is, a randomly generated offset is used to select a first set of lines from within all of the strata (one line per stratum), then a new random offset is generated and used to select a second set of lines from all of the strata, and so on until the sequence for an entire frame is created. Thus while line selection is random, the reuse of the random number across neighboring strata means that neighboring lines at the border of two strata will not be ordered together.

The code of FIG. 12B demonstrates how this approach might be implemented, wherein the scan line sequence is initially structured per FIG. 12A and then the order is randomized by randomly swapping the order of two scan lines from within each stratum, using the same random value to swap scan lines for all strata. This ensures that a frame is initially complete with all scan lines then breaks up patterns randomly but ensuring that neighboring lines are not sequential because they are consistently swapped within strata.

The above scheduling approaches may also be used for two dimensional transducers arrays. The 2D array may be positioned to face downhole, i.e. at an end of the device, facing in the longitudinal direction. Or the 2D array 12 be distributed on a dome-shaped surface, qua FIG. 8, with elements facing downhole and radially. Here, beam-forming for a single line 11 may be provided by plural transducers 13 in a row or column or both that surround the central transducer (see dotted lines enveloping 7 transducers).

Figures 7A, 7B:
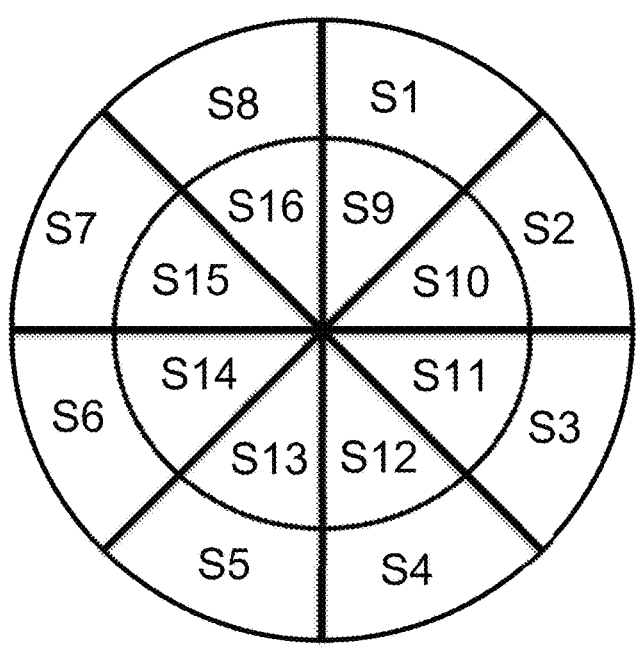
FIG. 7A is a 2D array stratified into rectangular strata.
FIG. 7B is a 2D array stratified into polar-radial strata.

Instead of working through all lines, row by row, column by column, waiting for each line to complete its Tx and Rx, a 2D scheduler schedules interleaves Tx and Rx for different scan lines, as taught above. A 2D array may be stratified into blocks of Y columns and Z rows (preferably $z \approx y$), so each stratum contains $N/(Y \times Z)$ lines. FIG. 7A shows a 2D rectangular array stratified into 2×2 blocks. Similarly, a circular or dome structured array may be stratified into polar/radial blocks. As shown in FIG. 7B there are 16 strata S1-S16, created by 8 polar slices and 2 radii.

As taught in the above alternatives, the scheduler selects one scan line from each stratum in a structured approach, random approach, or with correlated sampling.

The device comprises a processing circuit for generating and receiving signals from the transducers. The skilled person will appreciate that the circuit may implement logic in various combinations of software, firmware, and hardware that store instructions process data and carry out the instructions. Specialized Ultrasound circuits exist to drive and receive arrays of ultrasound transducers, such as LM96511 from Texas Instruments. FIG. 8 reproduced from the corresponding Data Manual (www.ti.com/lit/ds/snas476h/snas476h.pdf accessed 1 Aug. 2018) provides an example circuit comprising a computer processor (for display and post processing), FPGA block 84, Summing Amps 86, ADC 85, MUX/DEMUX 82, High Voltage T/R switch 83, High Voltage Pulser 81, and timing chips. The FPGA is an efficient chip for integrating many logical operations. The block may comprise Tx beamforming 89 and Rx beamforming 88, DVGA control (Digitally controlled Variable Gain Amplifiers), as well as data processing operations 87, such as B-mode (brightness mode) and Doppler processing. Although not shown, the circuit may additionally comprise motor drivers and memory chips.

Without loss of generality, each of these components may comprise multiples of such chips, e.g. the memory may be multiple memory chips. For the sake of computing efficiency, several of the functions and operations described separately above may actually by combined and integrated within a chip. Conversely certain functions described above may be provided by multiple chips, operating in parallel. For example, the LM96511 chip operates eight transducers, so four LM96511 chips are used to operate an aperture of 32 transducers.

The computer processor accesses instructions stored in the memory. The instructions may control the operation of the device, its actuators, and high-level scanning steps, while the actual timing of transducers may be left to FPGA 84. The FPGA memory may store the sequence of lines, transducer addresses comprised in a given line, and the timing delays of the transducers in the aperture. The FPGA generates a set of timing signals as well as selection signals to control the MUX. The pulser receives the timing signals and generate one or more pulses of electrical energy to vibrate the piezoelectrical crystals at the drive frequency. The MUX selects the desired set of transducers in the scan line to receive the timed pulses. The HV switch 83 prevents the high voltage pulses from reaching the analog front end 80.

During the Receive window, the switch 83 connects the analog chip 80 to the same transducers selected by the MUX. The signals may be sampled at a higher frequency than the pulse frequency, preferably at least twice the pulse frequency. The same delay timings are applied to the received signals to offset the signals and sum them using the Summing Amp 86. ADC 85 converts the summed signal to the digital domain, which data is processed in B-mode or Doppler mode.

Array Centering

The device may comprise a robotic manipulator to position the array with high-precision. In particular, the manipulator is useful for ensuring that the array is radially centered in the well or between the well wall and an object in the well. Patent application GB1813356.1 filed 16 Aug. 2018, incorporated herein by reference, describes a downhole device having a sensing array mounted to an end effector which is independently movable along multiple degrees of freedom. Here a frame may comprise all the scan lines in a curvilinear array arranged axially. A 2D frame may be created by sweeping the array through axial rotation, with scan lines separated axially and at different radial angles, reusing the same axial scan lines.

Actuators provide coarse 22 and fine 24 movement of the sensor along the longitudinal axis (sometimes called axial axis or Z direction) of the device, which generally corresponds to the longitudinal axis of the well/pipe 2. Separate actuators provide transverse movement 26, also called side-to-side or x and y movement. As most well and tubes are circular in cross section, this direction may also be called radial, i.e. moving from the center towards the wall.

Transverse Actuation

Figure 11A:
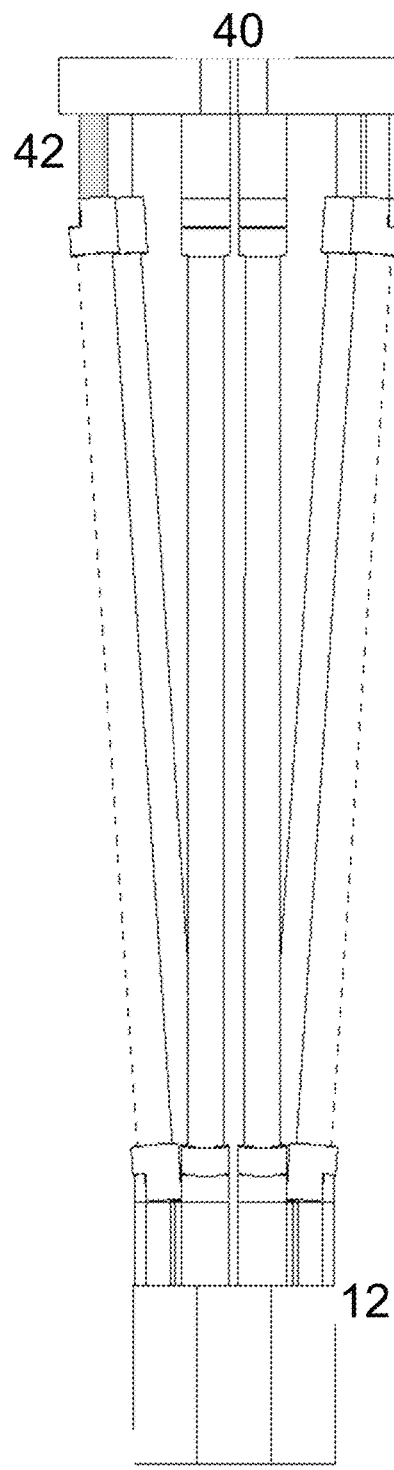
FIG. 11A is a side-view of a delta robot in a centered position.
Figure 11B:
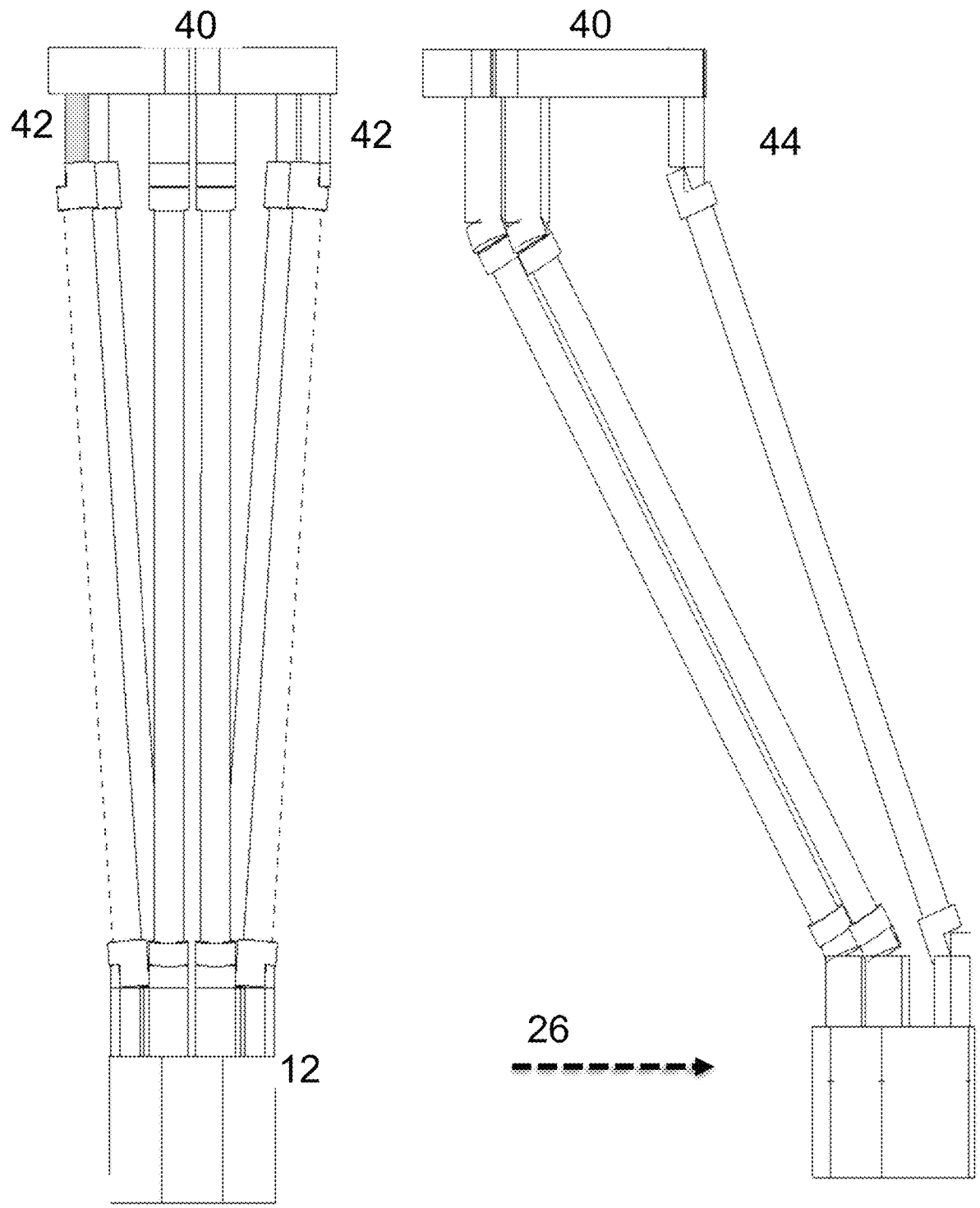
FIG. 11B is a side-view of a delta robot in an off-center position.
Figure 13:
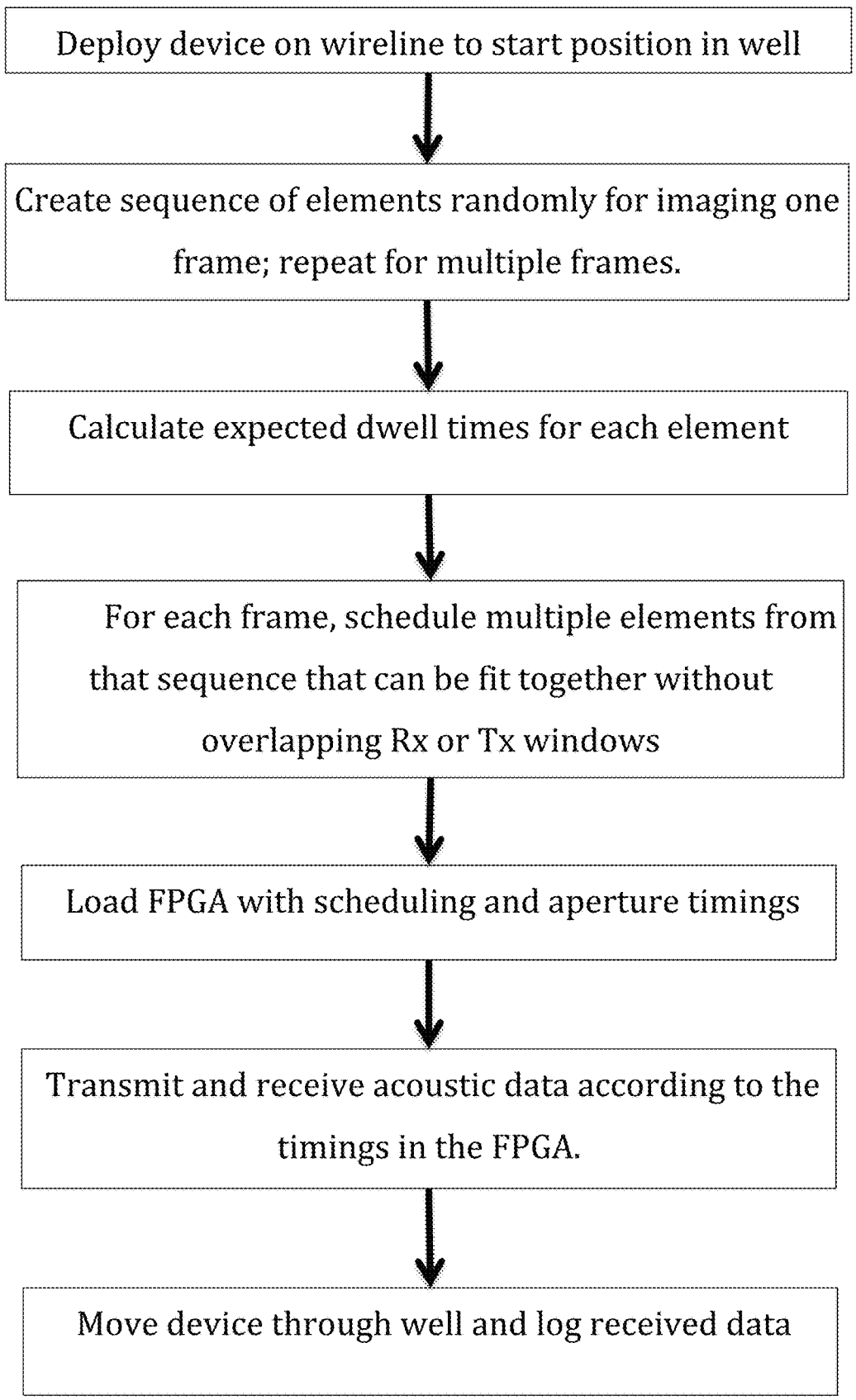
FIG. 13 is a workflow for scheduling transducers.

FIG. 11A shows a Delta-configured platform for moving the distal end (i.e. the end effector) of the device where the array 12 is located. The Delta configuration provides transverse motion whilst maintaining the orientation of the sensor. As seen in FIG. 11B, the movement of the pairs of parallelogram arms 42, 44 moves the sensor off-center, without changing the orientation of the array 12.

The Delta platform comprises three pairs of parallel arms 42, 42 and 44. In preferred embodiments, arms 44 are fixed to the proximal base 46 but pivotable thereto. The arms 42, 42 both pivot and extend from the top plate. Arms 42 are actuated to move axially to provide two transverse degrees of freedom (DOF), with minimal axial translation.

The skilled person will appreciate that other configurations may provide transverse manipulation of the end-effector, independent from an axial drive, such as a Cartesian manipulator.

Centralizing Elements

Figure 10:
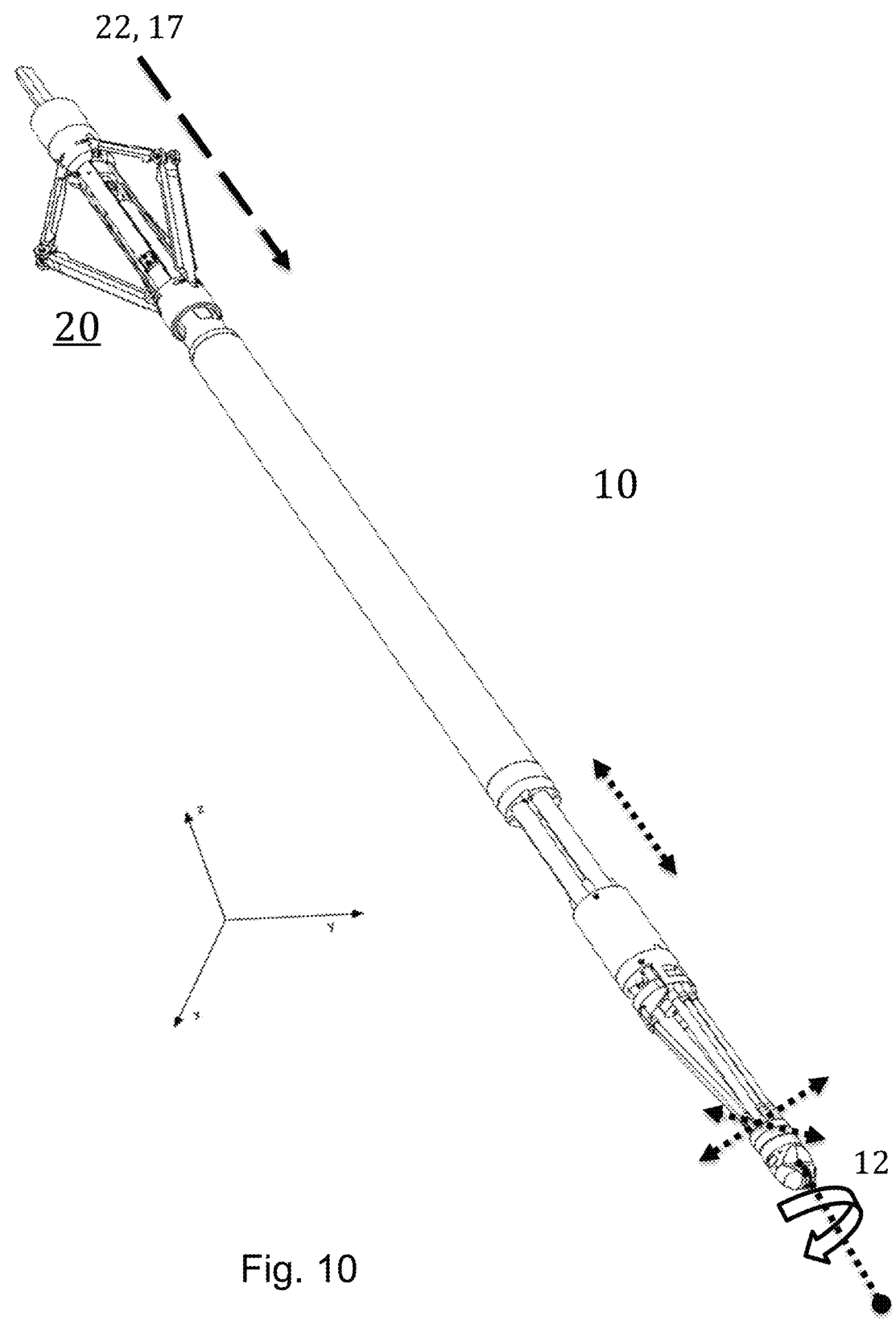
FIG. 10 is a perspective view of an imaging device with centralizers, sensor and robot.

The imaging device 10 may also include one or more passive centralizing elements for keeping the imaging device in the center of the wellbore. FIG. 10 illustrates a device comprising a centralizing element 20, wherein the centralizing arms extend outwardly and abut the inner wall of the well casing or liner to keep the device in the center of the well or pipe.

Deployment System

The imaging device includes a connection to a deployment system for running the imaging device 10 into the well 2 and removing the device from the well. Generally, the deployment system is wireline 17 or coiled tubing that may be specifically adapted for these operations. Other deployment systems can also be used, including downhole tractors and service rigs.

Power & Memory System

The imaging system can be powered by an electric cable run from the well surface or by onboard batteries. The data from the imaging system can be conveyed uphole to the well surface through a transmission line for immediate viewing of the images in real-time. The data may also be stored onboard the imaging device for later retrieval in the event of a communication loss. The imaging system may record images continually or it may be triggered manually and/or automatically, such as through the use of movement triggers.

Operation

The present imaging device may be operator by an operator using manual controls such as joysticks or using a Graphic User Interface via a computing device. Control signals are sent from the operator's input down the wireline to the device's control board 15.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A method of operating a device having an array of acoustic transducers, the method comprising:
   deploying the device into a well or pipe;
   capturing frames comprising plural scan lines, each scan line generated by plural of the acoustic transducers;
   stratifying the scan lines into strata based on physical proximity on the array;
   creating a scan line sequence for a frame such that consecutive scan lines are from different strata;
   scheduling scan lines according to the sequence; and
   for each scan line, transmitting an acoustic wave during a transmission period then receiving a reflected acoustic wave during a receiving period, separated from the transmission by a dwell period, wherein the transmit period of a given scan line is scheduled during the dwell period of a previous scan line.

2. The method of claim 1, further comprising logging the well or pipe by moving the device through the well or pipe while capturing frames.

3. The method of claim 1, wherein scan lines are added to the sequence by randomly selecting scan lines from within each stratum.

4. The method of claim 1, wherein scan lines are added to the sequence by selecting scan lines from the strata to maximize the physical distance between consecutive scan lines in the sequence.

5. The method of claim 1, wherein scan lines are scheduled such that that no transmission period overlaps with another transmission or receiving period.

6. The method of claim 1, further comprising determining dwell times based on the time-of-flight of the acoustic wave in the well from the array to an inner wall of the well or pipe.

7. The method of claim 1, wherein the transmission period of at least some scan lines are scheduled between the receiving periods of two previous scan lines.

8. The method of claim 1, wherein the transmission periods of at least two scan lines are scheduled during the dwell period of a previous scan line.

9. The method of claim 1, further comprising actively centralizing the array of acoustic transducers in the well or pipe.

10. The method of claim 1, wherein the acoustic transducers face radially away from the device and towards a wall of the well or pipe.

11. The method of claim 1, wherein the device comprises a circuit coupled to the array for addressing individual acoustic transducers and wherein transmitting comprises providing plural timed electrical pulses to plural transducers generating the scan line.

12. The method of claim 1, wherein the array is a two-dimensional array of transducers coupled to an end of the device, facing at least partly in the longitudinal direction of the well or pipe.

13. A device for logging a well or pipe comprising:
    an array of acoustic transducers and
    a processing circuit coupled to the acoustic transducers arranged to:
       capture frames of acoustic data, each frame comprising plural scan lines;
       stratify the scan lines into strata based on physical proximity on the array;
       create a scan line sequence for a frame such that consecutive scan lines are from different strata;
       schedule scan lines according to the sequence;
       generate selection signals to select a set of the acoustic transducers for each scan line;
       generate timing signals for each of the selected transducers;
       generate electrical pulses to transmit an acoustic wave by the selected transducers during a transmission period;
       convert a reflected acoustic wave at the selected transducers to an electrical signal during a receiving period;
       schedule, for each scan line, the transmit period and the receive period, separated by a dwell period; and
       schedule the transmit period of a given scan line during the dwell period of a previous scan line.

14. The device of claim 13, wherein the processing circuit comprises a Field Programmable Gate Array (FPGA) for generating the timing signals.

15. The device of claim 13 wherein the processing circuit comprises a memory for storing a sequence of the scan lines.

16. The device of claim 15, wherein the sequence is ordered to maximize the physical distance between consecutive scan lines.

17. The device of claim 13, wherein the processing circuit comprises logic to schedule scan lines such that no transmission period overlaps with another transmission or receiving period.

18. The device of claim 13, wherein the processing circuit comprises logic to calculate dwell times based on the time-of-flight of the acoustic wave in a well from the array to an inner wall of the well or pipe.

19. The device of claim 13, wherein the processing circuit comprises multiplexers for generating the selection signals.

* * * * *